United States Patent [19]

Park

[11] Patent Number: 5,943,225
[45] Date of Patent: Aug. 24, 1999

[54] CIRCUIT FOR REMOVING A PEAK REVERSE VOLTAGE GENERATED FROM A POWER SUPPLY SOURCE

[75] Inventor: Tae Jin Park, Suwon, Rep. of Korea

[73] Assignee: SamSung Electronics Co., Ltd., Suwon, Rep. of Korea

[21] Appl. No.: 08/976,586

[22] Filed: Nov. 24, 1997

[30] Foreign Application Priority Data

Nov. 22, 1996 [KR] Rep. of Korea ............... 96-56730

[51] Int. Cl.$^6$ ............................... H02H 7/125
[52] U.S. Cl. ............................... 363/53; 363/126
[58] Field of Search ............... 363/53, 21, 45, 363/126

[56] References Cited

U.S. PATENT DOCUMENTS

| | | | |
|---|---|---|---|
| 3,678,368 | 7/1972 | Popp | 363/17 |
| 3,733,519 | 5/1973 | Griffey | 361/91 |
| 4,093,877 | 6/1978 | Pollmeier | 327/109 |
| 4,271,445 | 6/1981 | Hartman et al. | 361/56 |
| 4,462,069 | 7/1984 | Becky | 363/23 |
| 4,689,713 | 8/1987 | Hourtane et al. | 361/118 |
| 4,910,654 | 3/1990 | Forge | 363/49 |
| 4,977,493 | 12/1990 | Smith | 363/126 |
| 5,351,179 | 9/1994 | Tsai et al. | 363/53 |

OTHER PUBLICATIONS

An Overview of Low–Loss Snubber Technology for Transistor Converters, Angelo Ferraro, Corporate Research and Development, General Electric Company, IEEE, 1982, pp. 466–477.

*Primary Examiner*—Shawn Riley
*Attorney, Agent, or Firm*—Robert E. Bushnell, Esq.

[57] ABSTRACT

A circuit is disclosed comprising a switching rectification diode for rectifying a reverse transient voltage, a charging capacitor for charging an output voltage from the switching rectification diode thereon, and a discharging resistor connected in parallel to the charging capacitor, for discharging the voltage charged on the charging capacitor. With no limitation in frequency band, the circuit can effectively remove an instantaneous reverse transient voltage such as a reverse surge voltage or a reverse ringing voltage which results from abrupt variations in output voltages from preceding circuits. In addition, the circuit can stabilize operation of the associated device despite of heat so that individual components can be set to lower reverse withstand voltages.

17 Claims, 4 Drawing Sheets

CIRCUIT FOR REMOVING A PEAK REVERSE VOLTAGE GENERATED FROM A POWER SUPPLY SOURCE

CLAIM FOR PRIORITY

This application makes reference to, incorporates the same herein, and claims all benefits accruing under 35 U.S.C. §119 from an application for PEAK REVERSE VOLTAGE REMOVING CIRCUIT earlier filed in the Korean Industrial Property Office on the 22$^{nd}$ of November 1996, and there duly assigned Ser. No. 56730/1996, a copy of which application is annexed hereto.

BACKGROUND OF THE INVENTION

1. Technical Field

The present invention relates to protection circuitry and, more particularly, to a circuit for removing a peak reverse voltage generated from a power supply source.

2. Related Art

Generally, almost all electronic circuits are stressed by a surge of overvoltages of an impulse type or a transient of ringing voltages of a vibrating type which results from variations of output voltages from preceding circuits such as voltage generators. Such electronic circuits may be rectification circuits, inductance circuits including coils which generate a counter electromotive force according to current variations, and other auxiliary circuits which are connected to power supply sources for generating voltages varied in the form of pulses. The surge of overvoltages and the input of transient voltages may alter operation of the electronic circuits and shorten the life span of individual components of the electronic circuits. In some situations, the electronic circuits may be damaged extensively if the supply voltages are reversed.

Contemporary protection circuits against high transient overvoltages or forward and reverse surges of voltages are disclosed, for example, in U.S. Pat. No. 3,678,368 for Overvoltage Protection Arrangement For Power Converters issued to Popp, U.S. Pat. No. 3,733,519 for Protection Circuit For Regulated Power Supplies issued to Griffey, U.S. Pat. No. 4,271,445 for Solid-State Protector Circuitry Using Gated Diode Switch issued to Hartman et al., U.S. Pat. No. 4,462,069 for DC—DC Voltage Regulator Having An Input Protection Circuit, A DC—DC Inverter, A Saturable Reactor Regulator, And Main And Auxiliary Rectifying And Filtering Circuits issued to Becky, U.S. Pat. No. 4,689,713 for High Voltage Surge Protection For Electrical Power Line issued to Hourtane et al., and U.S. Pat. No. 4,910,654 for Current Limiting Scheme For The AC Input Circuit To A Switch Mode Power Supply issued to Forge. For DC—DC converters which include pulse voltage generators and rectification circuits, snubber circuits are generally used to provide protection against high transient overvoltages or forward and reverse surge of voltages across the rectification circuits. A typical snubber circuit is composed of either a charging capacitor connected in parallel across the rectification circuit, or a series of charging capacitor and resistor connected in parallel across the rectification circuit. However, the charging capacitor in both configurations is limited in capacitance and becomes instable due to heat. In addition, if the reverse surge of voltages exhibits a frequency higher than a specified frequency, the snubber circuit cannot effectively protect the rectification circuit from the reverse surge of voltages because the discharging time of the charging capacitor is limited.

SUMMARY OF THE INVENTION

Accordingly, it is therefore an object of the present invention to provide a voltage surge protection for a power supply source.

It is also an object to provide a peak reverse voltage removing circuit for providing protection against transient voltages and surges of overvoltages in a DC—DC converter.

It is another object to provide a peak reverse voltage removing circuit usable in a DC—DC converter including a pulse voltage generator and a rectification circuit for effectively removing an instantaneous reverse transient voltage such as a reverse surge voltage or a reverse ringing voltage which results from abrupt variations in output voltages from the pulse voltage generator in order to stabilize operation of the rectification circuit despite of heat.

These and other objects of the present invention can be achieved by a peak reverse voltage removing circuit for use in a DC—DC converter which comprises a pulse voltage generator having a first input terminal coupled to a power supply source, a second input terminal coupled to receive an input switching pulse, and an output terminal for generating a series of voltage pulses in accordance with the input switching pulse; and a rectifier connected to the output terminal of the pulse voltage generator, for rectifying the series of voltage pulses into a direct current output voltage. The peak reverse voltage removing circuit is connected to the output terminal of the pulse voltage generator and in parallel to the rectifier to provide protection against a surge of reverse transient voltages. The peak reverse voltage removing circuit comprises a switching rectification diode for rectifying the surge of reverse transient voltages; a charging capacitor for charging an output voltage from the switching rectification diode; and a discharging resistor connected in parallel to the charging capacitor for discharging the output voltage charged by the charging capacitor.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
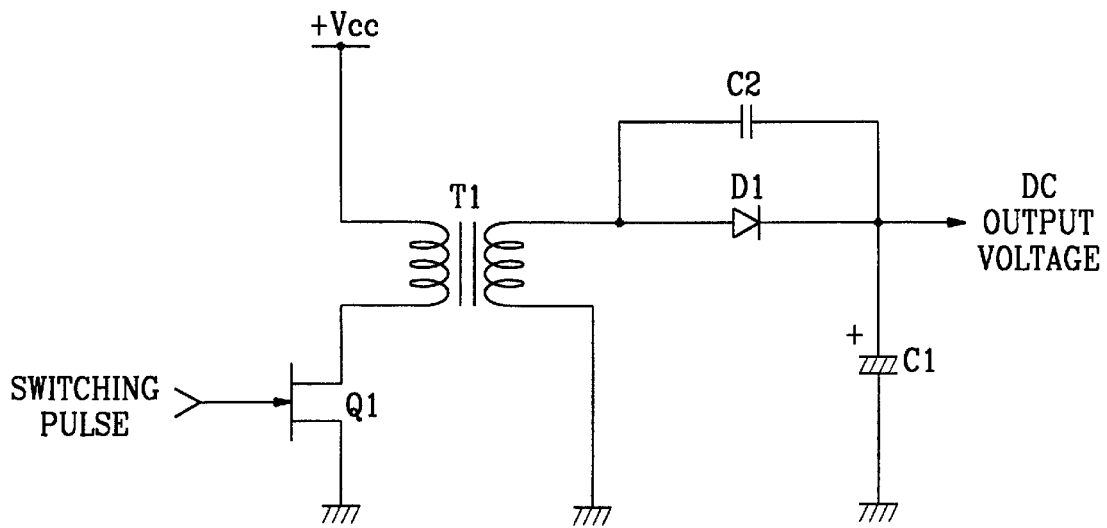
FIG. 1 is a circuit diagram of a DC—DC converter using a typical snubber circuit for providing protection against transient voltages and surges of overvoltages.

Referring now to the drawings and particularly to FIG. 1, which illustrates a DC—DC (direct current) converter using a typical snubber circuit to provide protection against transient voltages and surges of overvoltages. As shown in FIG. 1, the DC—DC converter comprises a switching field effect transistor Q1, a power transformer T1 having primary and secondary coils, a rectification circuit which comprises a diode D1 and a charging capacitor C1, and the snubber circuit which comprises a charging capacitor C2 connected in parallel to the rectification circuit.

The switching field effect transistor Q1 is disposed to perform ON/OFF operations in response to an input switching pulse signal. The switching field effect transistor Q1 has its gate terminal for receiving the input switching pulse signal and its source terminal connected to a ground voltage source. The power transformer T1 has the primary coils connected to a DC supply voltage source+Vcc and a drain terminal of the switching field effect transistor Q1, and the secondary coil of the power transformer T1 connected to the ground voltage source. The rectification circuit connected to the other side of the secondary coil of the power transformer T1. The rectification circuit includes a rectification diode D1 having its anode connected to the other side of the secondary coil of the power transformer T1, and a charging capacitor C1 having its positive pole connected to a cathode of the rectification diode D1 and its negative pole connected to the ground voltage source. The snubber circuit comprises a charging capacitor C2 connected in parallel across the rectification diode D1 in the rectification circuit.

The operation of the DC—DC converter using the snubber circuit as shown in FIG. 1 will now be described hereinbelow. First, the switching field effect transistor Q1 is repeatedly turned on and off in response to the switching pulse signal, so that energy can periodically be induced in the primary coil of the power transformer T1. As a result, a voltage is generated in the form of pulses in the secondary coil of the power transformer T1. Then, the voltage in the secondary coil of the power transformer T1 is rectified by the rectification diode D1 and smoothed by the charging capacitor C1. The rectified and smoothed voltage is the final DC output voltage.

When the voltage in the secondary coil of the power transformer T1 is changed from a low level to a high level during the above operation, an instantaneous forward surge voltage of high level is applied to the rectification diode D1 and then absorbed and removed by the rectification diode D1 and charging capacitor C1. By contrast, when the voltage in the secondary coil of the power transformer T1 is changed from high to low in level, an instantaneous peak reverse voltage (reverse surge voltage) of high level is applied to the rectification diode D1. At this time, if the applied peak reverse voltage is higher than a reverse withstand voltage of the rectification diode D1, the peak reverse voltage will damage the rectification diode D1. In this case, the voltage which was charged on the charging capacitor C2 of the snubber circuit when the voltage in the secondary coil of the power transformer T1 was high in level is discharged through the secondary coil of the power transformer T1. As a result, the peak reverse voltage across the rectification diode D1 is bypassed and removed. However, the charging capacitor C2 is limited in capacitance. Capacitor current can generally be expressed as follows:

$i_c = C(dv/dt)$

In the case where the charging capacitor C2 is large in capacitance, current $i_{c2}$ flowing through the charging capacitor C2 is increased in amount because of a narrow pulse width (i.e., a large dv/dt value) of the peak reverse voltage. As the current $i_{c2}$ is increased in amount, heat is generated by the charging capacitor C2. The generated heat damages the charging capacitor C2 and raises a temperature in the associated device, resulting in a bad effect on the entire stability of the device. Further, when the peak reverse voltage has a frequency higher than a specified frequency, it cannot be removed because of a limitation in discharging time of the charging capacitor C2.

Figure 2:
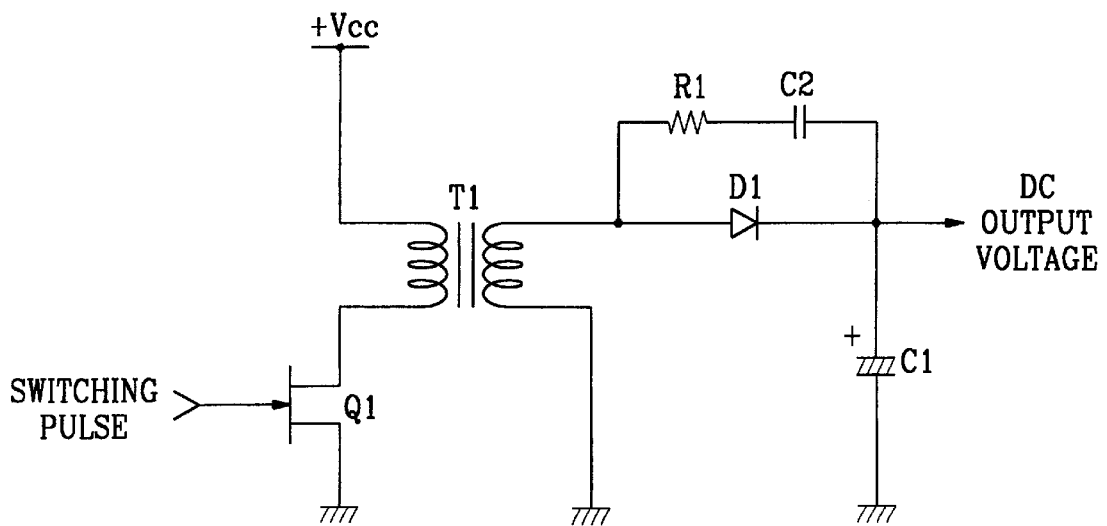
FIG. 2 is a circuit diagram of a DC—DC converter using another snubber circuit for providing protection against transient voltages and surges of overvoltages.

FIG. 2 illustrates a DC—DC converter using another snubber circuit to provide protection against transient voltages and surges of overvoltages. The construction of the DC—DC converter is the same as that of FIG. 1, with the exception that the snubber circuit further comprises a resistor R1 connected in series to the charging capacitor C2. As shown in FIG. 2, the resistor R1 is included in the discharging loop when the peak reverse voltage is generated. As a result, the charging capacitor C2 is increased in capacitance by reducing a resistance of the resistor R1. However, the frequency is limited by the resistor R1 and capacitor C2 similarly to the construction of FIG. 1. Further, heat is generated due to the increase in the capacitance of the charging capacitor C2 and the reduction in the resistance of the resistor R1.

Figure 3A:
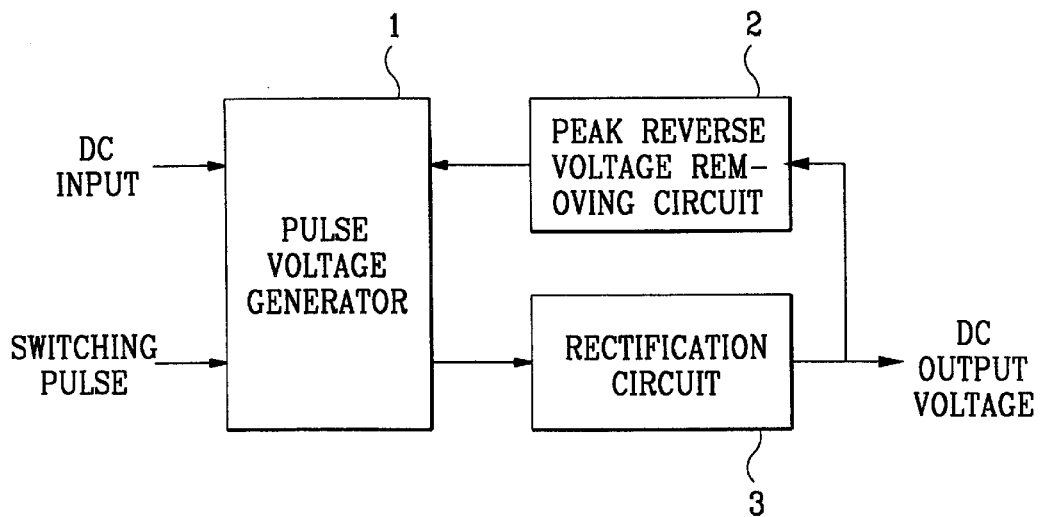
FIG. 3A is a block diagram of a DC—DC converter using a peak reverse voltage removing circuit for providing protection against transient voltages and surges of overvoltages as constructed according to the principles of the present invention.
Figure 3B:
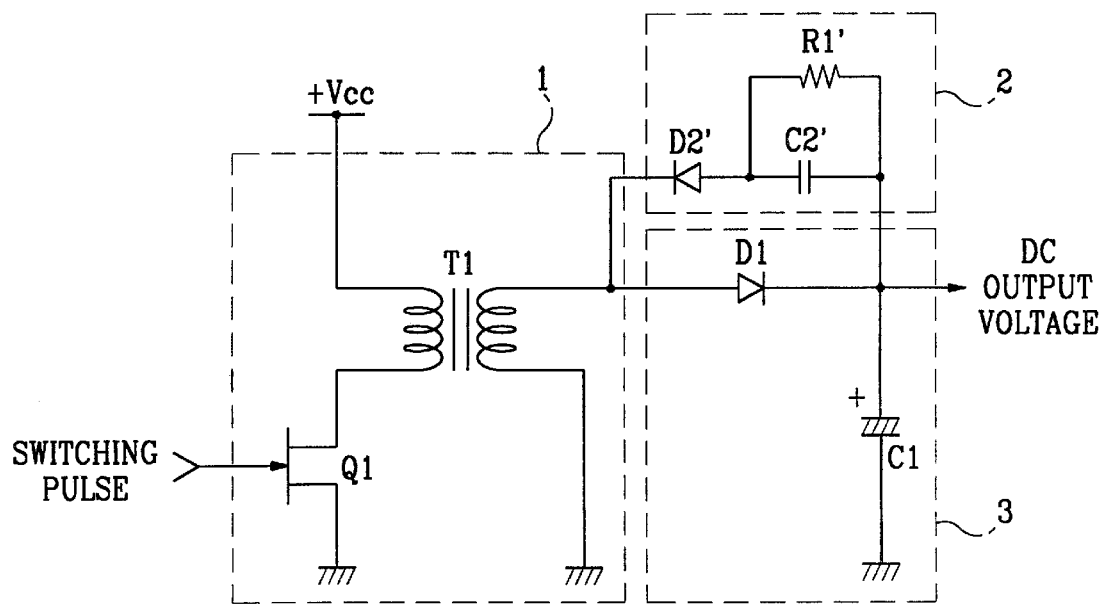
FIG. 3B is a detailed circuit diagram of the DC—DC converter using the peak reverse voltage removing circuit as shown in FIG. 3A.

Turning now to FIGS. 3A and 3B which illustrate the construction of a DC—DC converter using a peak reverse voltage removing circuit for protection against transient voltages and surges of overvoltages according to the principles of the present invention. As shown in FIG. 3A, the DC—DC converter comprises a pulse voltage generator 1 for generating a voltage in the form of pulse, which is abruptly varied in level, a rectification circuit 3 for rectifying an output voltage from the pulse voltage generator 1 and suppressing forward surge and forward ringing voltages, and a peak reverse voltage removing circuit 2 connected in parallel to the rectification circuit 3, for removing reverse surge and reverse ringing voltages.

As shown in FIG. 3B, the pulse voltage generator 1 includes a switching field effect transistor Q1 and a power transformer T1. The rectification circuit 3 includes a rectification diode D1 and a charging capacitor C1. The peak reverse voltage removing circuit 2 includes a charging capacitor C2' having its one side connected to the cathode of the rectification diode D1 in the rectification circuit 3, a discharging resistor R1' connected in parallel to the charging capacitor C2', and a switching rectification diode D2' having its anode connected in series to the above RC parallel circuit and its cathode connected to the anode of the rectification diode D1.

The operation of the DC—DC converter with the above-mentioned construction in accordance with the present invention will now be described hereinbelow. First, the switching field effect transistor Q1 is repeatedly turned on and off in response to the switching pulse signal, so that energy can periodically be induced in the primary coil of the power transformer T1. As a result, a voltage is generated in the form of pulse in the secondary coil of the power transformer T1. Then, the voltage in the secondary coil of the power transformer T1 is rectified by the rectification diode D1 and smoothed by the charging capacitor C1. The rectified and smoothed voltage is the final DC output voltage.

At that time the voltage in the secondary coil of the power transformer T1 is changed from low to high in level during the above operation, an instantaneous forward surge voltage of high level is applied to the rectification diode D1 and then absorbed and removed by the rectification diode D1 and charging capacitor C1 (see portions A in FIGS. 4 and 5). While the voltage in the secondary coil of the power transformer T1 remains at its high level state, a reverse voltage is applied to the switching diode D2', thereby causing charging current not to flow to the discharging resistor R1' and charging capacitor C2'. As a result, a voltage which was charged on the charging capacitor C2' when the voltage in the secondary coil of the power transformer T1 was low in level is discharged through the discharging resistor R1'. At this time, the discharging current may be very feeble by setting the discharging resistor R1' to a value within the range of several hundred kilo-ohms to several mega-ohms.

Figure 4A:
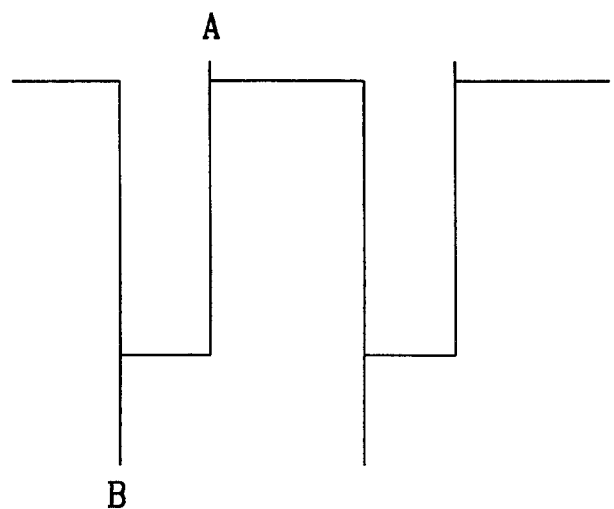
FIG. 4A is a waveform diagram illustrating a peak surge voltage typically experienced by the DC—DC converter using a typical snubber circuit.
Figure 4B:
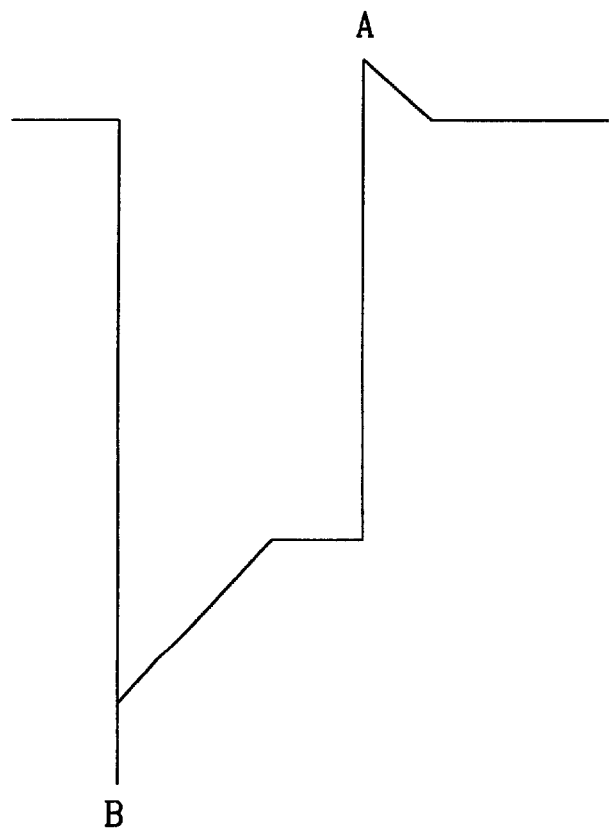
FIG. 4B is a partially enlarged view of the peak surge voltage as shown in FIG. 4A.
Figure 5A:
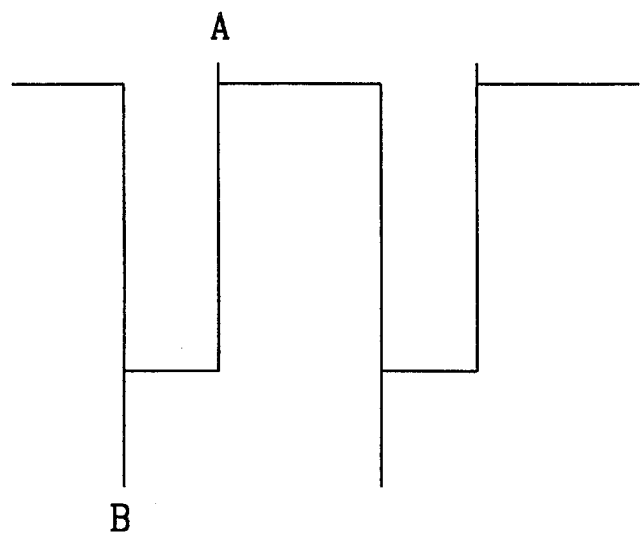
FIG. 5A is a waveform diagram illustrating a peak reverse voltage attenuated by the DC—DC converter using the peak reverse voltage removing circuit according to the principles of the present invention.
Figure 5B:
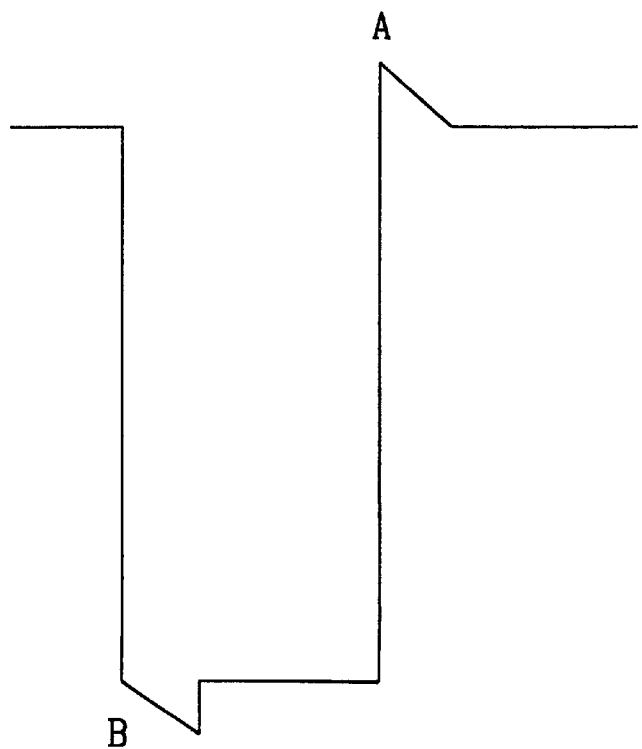
FIG. 5B is a partially enlarged view of the peak reverse voltage as shown in FIG. 5A.

On the other hand, at the moment that the voltage in the secondary coil of the power transformer T1 is changed from high to low in level, an instantaneous peak reverse voltage (reverse surge voltage) of high level is applied to the rectification diode D1 (see portions B in FIGS. 4A and 4B). At this time, if the applied peak reverse voltage is higher than a reverse withstand voltage of the rectification diode D1, the peak reverse voltage will damage the rectification diode D1.

In this case, the peak reverse voltage (reverse surge voltage) is rectified by the switching diode D2' and filtered into a DC component by the charging capacitor C2'. At this time, the peak reverse voltage is attenuated from the original value as indicated by "B" in FIGS. 4A and 4B to a value as indicated by "B" in FIGS. 5A and 5B by charging and discharging time constants of the charging capacitor C2' and discharging resistor R1'. As a result, the rectification diode D1 can be set to a lower reverse withstand voltage. Further, charging current flows through the charging capacitor C2' and the switching diode D2' while the voltage in the secondary coil of the power transformer T1 is low in level. Typically, a low duration of a pulse voltage induced in a secondary coil of a switching power circuit is shorter than a high duration thereof (i.e., about 15–20% of a period). In this connection, the charging current is considerably small in amount.

Because the charging current and the discharging current are small in amount, they have no negative effect on the temperature and stability in the associated DC—DC converter. In addition, while the peak reverse voltage removing circuit of the present invention is intended to remove transient voltages and surges of overvoltages applied to the rectification circuit of the DC—DC converter, its application is extended to all electronic circuits that are used to generate a pulse voltage. Moreover, while the transient voltage removed by the present invention is described in the form of a surge voltage, other forms of transient voltages such as a ringing voltage of the vibrating type, and an abnormal voltage on a transmission line may also be removed by the peak reverse voltage removing circuit of the present invention.

As described above, the present invention advantageously provides a peak reverse voltage removing circuit with no limitation in frequency band for effectively removing an instantaneous reverse transient voltage such as a reverse surge voltage or a reverse ringing voltage which results from abrupt variations in output voltages from the preceding circuits. In addition, the peak reverse voltage removing circuit can prevent the temperature in the associated device from rising due to the generation of heat, and can therefore assure the stability of the device. Moreover, the rectification diode and other components in the device can be set to lower reverse withstand voltages, resulting in a cost reduction.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A power conversion apparatus, comprising:
   a pulse voltage generator having a first input terminal coupled to a power supply source, a second input terminal coupled to receive an input switching pulse, and an output terminal for generating a series of voltage pulses in accordance with said input switching pulse;
   a rectifier having an input terminal and an output terminal, said input terminal of said rectifier being connected to said output terminal of said pulse voltage generator, said rectifier rectifying the series of voltage pulses into a rectified output voltage; and
   a circuit connected to said output terminal of said pulse voltage generator and in parallel to said rectifier, for providing protection against a surge of reverse transient voltages, said circuit comprising:
      charging means for charging the reverse transient voltages;
      discharging means connected in parallel to said charging means, for discharging the reverse transient voltages charged by said charging means; and
      switching rectification means connected in series to said charging means, for rectifying the surge of reverse transient voltages output from said charging means.

2. The power conversion apparatus of claim 1, further comprised of said charging means corresponding to a charging capacitor.

3. The power conversion apparatus of claim 1, further comprised of said discharging means corresponding to a resistor.

4. The power conversion apparatus of claim 1, further comprised of said switching rectification means corresponding to a diode.

5. The power conversion apparatus of claim 1, further comprised of said pulse voltage generator comprising a switching field-effect transistor having a gate terminal coupled to receive said input switching pulse, a source terminal connected to ground and a drain terminal indirectly connected to said power supply source; and a power transformer having primary coils connected between said power supply source and said drain terminal, and secondary coils serving as said output terminal to generate said series of voltage pulses in accordance with said input switching pulse.

6. The power conversion apparatus of claim 5, further comprised of said rectifier comprising a diode having an anode connected to the secondary coils of the power transformer, and a charging capacitor connected to a cathode of the diode for rectifying the series of voltage pulses into the rectified output voltage.

7. A peak reverse voltage removing circuit for use in a power electronic apparatus to provide protection against a surge of reverse transient voltages, comprising:

charging means for charging the reverse transient voltages;

discharging means connected in parallel to said charging means, for discharging the reverse transient voltages, said discharging means having an input terminal and an output terminal; and switching rectification means connected in series to said charging means, for rectifying the surge of reverse transient voltages output from said charging means, said switching rectification means including a diode having an anode connected to said input terminal of said discharging means and a cathode connected to a power source.

8. The peak reverse removing circuit of claim 7, further comprised of said charging means corresponding to a charging capacitor.

9. The peak reverse removing circuit of claim 7, further comprised of said discharging means corresponding to a resistor.

10. The peak reverse removing circuit of claim 7, further comprising a rectification circuit rectifying power received from the power source, wherein said switching rectification means in combination with said charging means are connected in parallel to said rectification circuit.

11. A power converter apparatus, comprising:

a pulse voltage generator having a first input terminal coupled to a power supply source, a second input terminal coupled to receive an input switching pulse, and an output terminal generating a series of voltage pulses in accordance with said input switching pulse;

a rectifier being connected to said output terminal of said pulse voltage generator, said rectifier rectifying the series of voltage pulses into a rectified output voltage; and a circuit being connected to said output terminal of said pulse voltage generator and in parallel to said rectifier, said circuit providing protection against a surge of reverse transient voltages, said circuit comprising:

a capacitor charging the reverse transient voltages;

a resistor being connected in parallel to said capacitor and discharging the reverse transient voltages charged by said capacitor; and a first diode having an anode and a cathode, said cathode being coupled to said output terminal of said pulse voltage generator, said anode being coupled to said capacitor, said first diode rectifying the surge of reverse transient voltages output from said capacitor.

12. The apparatus of claim 11, said pulse voltage generator further comprising:

a transistor having a gate terminal coupled to receive said input switching pulse, a source terminal connected to a local reference potential and a drain terminal indirectly connected to said power supply source; and a power transformer having primary coils connected between said power supply source and said drain terminal, and secondary coils serving as said output terminal to generate said series of voltage pulses in accordance with said input switching pulse.

13. The apparatus of claim 11, said rectifier further comprising:

a second diode having a cathode and an anode, said anode of said second diode being connected to said secondary coils of said power transformer; and a second capacitor being connected to said cathode of said second diode, said second diode and said second capacitor rectifying the series of voltage pulses into the rectified output voltage.

14. The apparatus of claim 12, wherein said transistor corresponds to a switching field-effect transistor.

15. The apparatus of claim 11, wherein the power supply source supplies a first direct current power to said pulse voltage generator.

16. The apparatus of claim 11, wherein the rectified output voltage corresponds to a direct current voltage.

17. The apparatus of claim 15, wherein the rectified output voltage corresponds to a second direct current voltage having a voltage level different from said first direct current voltage.

* * * * *